United States Patent
Furukawa

(10) Patent No.: US 8,754,654 B2
(45) Date of Patent: Jun. 17, 2014

(54) POWER SUPPLY DEVICE FOR DETECTING DISCONNECTION OF VOLTAGE DETECTION LINES

(75) Inventor: Kimihiko Furukawa, Kakogawa (JP)

(73) Assignee: Sanyo Electric Co., Ltd., Osaka (JP)

( * ) Notice: Subject to any disclaimer, the term of this patent is extended or adjusted under 35 U.S.C. 154(b) by 319 days.

(21) Appl. No.: 13/194,104

(22) Filed: Jul. 29, 2011

(65) Prior Publication Data

US 2012/0025836 A1    Feb. 2, 2012

(30) Foreign Application Priority Data

Jul. 30, 2010  (JP) .................................. 2010-172809
Apr. 21, 2011  (JP) .................................. 2011-095534

(51) Int. Cl.
*G01N 27/416*  (2006.01)
*H02J 7/00*    (2006.01)

(52) U.S. Cl.
USPC ............ 324/434; 320/118; 320/101; 324/433

(58) Field of Classification Search
USPC .................................. 324/434, 433; 320/118
See application file for complete search history.

(56) References Cited

U.S. PATENT DOCUMENTS

| 6,255,826 | B1 * | 7/2001  | Ohsawa et al. ........... 324/426 |
| 6,919,706 | B2 * | 7/2005  | Furukawa ................. 320/116 |
| 7,193,391 | B2 * | 3/2007  | Moore ..................... 320/116 |
| 7,564,217 | B2 * | 7/2009  | Tanigawa et al. ......... 320/118 |
| 8,269,460 | B2 * | 9/2012  | Ishikawa et al. ......... 320/122 |
| 8,330,420 | B2 * | 12/2012 | Kim et al. ................ 320/122 |
| 2012/0013304 | A1 * | 1/2012 | Murase et al. ............ 320/116 |

FOREIGN PATENT DOCUMENTS

JP         2010-81692     4/2010

\* cited by examiner

*Primary Examiner* — Drew A Dunn
*Assistant Examiner* — David Henze-Gongola
(74) *Attorney, Agent, or Firm* — Wenderoth, Lind & Ponack, L.L.P.

(57) ABSTRACT

A power supply device includes battery units. Each unit includes a battery block, a voltage detector, a power supply circuit, and a disconnection detector. The block includes serially-connected battery cells. The voltage detector detects the cell voltages through voltage detection lines. The power supply circuit supplies power from the block to the voltage detector. The voltage detector is powered by electric power from the block. The disconnection detector detects disconnection of the lines based on the detected cell voltages. An unbalance resistor is connected to one of the blocks to increase power consumption of this block. Thus, a current flows in the line that is connected to a node between this block and an adjacent block connected next to this block.

7 Claims, 7 Drawing Sheets

FIG. 3
PRIOR ART

|  | (1)<br>CURRENT VALUES IN<br>CASE OF Ip = 10 mA,<br>AND Id = 10 μA | (2)<br>CURRENT VALUES IN<br>CASE OF Ip1 = 10 mA,<br>Ip2 = 10.05 mA, AND Id = 10 μA |
|---|---|---|
| V1 | I1=10.01mA | I1=10.01mA |
| V2 | I2=10.02mA | I2=10.02mA |
| V3 | I3=10.03mA | I3=10.03mA |
| V4 | I4=10.04mA | I4=10.04mA |
| V5 | I5=10.05mA | I5=10.05mA |
| V6 | I6=10.06mA | I6=10.06mA |
| V7 | I7=10.01mA | I7=10.06mA |
| V8 | I8=10.02mA | I8=10.07mA |
| V9 | I9=10.03mA | I9=10.08mA |
| V10 | I10=10.04mA | I10=10.09mA |
| V11 | I11=10.05mA | I11=10.10mA |
| V12 | I12=10.06mA | I12=10.11mA |

SINCE CURRENT VALUES OF THE TWO PARTS ARE THE SAME, DISCONNECTION OF VOLTAGE DETECTION LINE BETWEEN THEM CANNOT BE DETECTED.

POWER SUPPLY DEVICE FOR DETECTING DISCONNECTION OF VOLTAGE DETECTION LINES

BACKGROUND OF THE INVENTION

1. Field of the Invention

The present invention relates to a power supply device including a battery pack including a number of battery cells serially connected to each other, and in particular to a power supply device detecting voltages of the battery cells and safely charging/discharging the battery cells.

2. Description of the Related Art

A battery pack required to provide a large amount of output includes a number of battery cells serially connected to each other for increasing output voltage. Since the battery cells in this battery pack are serially connected to each other, the charging and discharging current values of all of the battery cells are same as each other. However, in the battery pack including a number of battery cells serially connected to each other, since the battery cells cannot have completely the same characteristics, the unbalance between their electrical characteristics may bring a particular battery cell to be over-charged or over-discharged. If a battery cell is over-charged or over-discharged, the battery cell will remarkably deteriorate, and may be brought into a dangerous condition. In order to prevent this, in a battery pack including a number of battery cells serially connected to each other, the voltages of the battery cells are detected so that the battery cells are charged/discharged under control. For example, in the case where the battery pack is charged, if the voltage of a particular battery cell becomes higher than a predetermined maximum voltage, the battery pack stops being charged. On the other hand, in the case where the battery pack is discharged, if the voltage of a particular battery cell becomes lower than a predetermined minimum voltage, the battery pack stops being discharged. Thus, the battery pack is charged/discharged with the battery cells being protected.

In a power supply device charging/discharging the battery pack with the battery cells being protected, the power supply device includes a voltage detecting circuit that detects the voltages of the battery cells, and controls charging/discharging operation based on the voltages of the battery cells detected by this voltage detecting circuit. The voltage detecting circuit is connected to the positive and negative sides of the battery cells through voltage detection lines. In the case where a power supply device includes a number of battery cells serially connected to each other, since such a voltage detecting circuit is connected to the battery cells through a number of voltage detection lines, if any of voltage detection lines is disconnected, the voltage detecting circuit cannot properly detect the voltages of the battery cells.

In a power supply device including a number of battery cells serially connected to each other, the power supply device is composed of a plurality of battery units 90, as shown in FIG. 1 (see Japanese Patent Laid-Open Publication No. JP 2010-81692 A). Each of the battery units 90 includes a battery block 92, a voltage detecting circuit 94, and a power supply circuit 95. The battery block 92 includes a plurality of battery cells 93 serially connected to each other. The voltage detecting circuit 94 detects the voltages of the battery cells 93, which compose corresponding one of the battery blocks 92. The power supply circuit 95 supplies electric power to a power supply of the voltage detecting circuit 94. The plurality of battery blocks 92 are connected serially to each other, and compose a battery pack 91.

In this illustrated power supply device, each of the battery units 90 includes the voltage detecting circuit 94 for detecting the voltages of the battery cells 93, which compose corresponding one of the battery blocks 92. When operated, each of the voltage detecting circuits 94 is supplied with electric power from corresponding one of the battery blocks 92. For example, DC/DC converters are used as the power supply circuits 95, which supply electric power for operating the voltage detecting circuits 94 from the battery blocks 92. In this illustrated power supply device, which includes the battery pack 91 composed of the plurality of battery blocks 92 serially connected to each other, the remaining capacities of the battery blocks 92 will be unbalanced. The unbalance between the remaining capacities increases the probability that a particular battery block 92 will be over-charged or over-discharged, which in turn may cause battery deterioration. For this reason, in order to eliminate the unbalance, equalizing circuits 97 are connected to the battery blocks 92. That is, the known power supply device is designed to reduce the unbalance between the battery blocks 92.

However, in the power supply device, which includes the battery pack 91 composed of the plurality of battery blocks 92 serially connected to each other, the unbalance between the currents of the power supply circuits 95 of the battery units 90 makes it difficult to detect disconnection of the voltage detection lines 96. In the normal condition, if disconnection occurs in the voltage detection line 96 through which current flows, the current stops flowing through the voltage detection line 96, which in turn changes the detection voltage detected by the voltage detecting circuit 94. Thus, in the case where a current flows through the voltage detection line 96 in the normal condition, it is possible to detect disconnection of the voltage detection line 96. However, in the case where a current does not flow through the voltage detection line 96 in the normal condition, the current value in the voltage detection line 96 does not change even if disconnection occurs in the voltage detection line 96. Accordingly, it is impossible to detect disconnection of the voltage detection line 96. The reason why disconnection of the voltage detection line 96 cannot be detected in the case where a current does not flow through the voltage detection line 96 in the normal condition is that the condition where a current does not flow in a line is the same as condition where a resistor with infinite resistance is connected on the line.

In the power supply device, which includes plurality of battery blocks 92 serially connected to each other as shown in FIG. 1, a current will not flow through one of the voltage detection lines 96 if the power supply circuits 95 of the battery blocks 92 have particular amounts of consumption currents. For this reason, disconnection of the one of the voltage detection lines 96 cannot be detected through which the current does not flow.

FIGS. 2 and 3 show this reason. In a power supply device shown in FIG. 2 includes a battery pack 71 composed of three battery blocks 72, which are serially connected to each other. Each of the battery blocks 72 is composed of six battery cells 73, which are serially connected to each other. In the circuit construction shown in FIG. 2, input resistors 79 are connected to the battery cells 73. Accordingly, an input current (Id) flows in the battery cell 73 through the input resistor 79. In addition, consumption currents (Ip) of power supply circuits 75 flow in the battery blocks 72. The power supply circuits 75 supply electric power to voltage detecting circuits 74. DC/DC converters are used as the power supply circuits 75. The consumption currents of the power supply circuits 75 correspond to consumption currents (Ip) of the DC/DC converters. The consumption current values of DC/DC converters cannot be completely the same as each other. For this reason, consumption currents are unbalanced.

FIG. 3(1) indicates the values of currents, which flow in the battery cells 73, in the condition where consumption currents (Ip) of the power supply circuits 75 of the first and second battery units 70A and 70B are the same current value of 10 mA. FIG. 3(2) indicates current values, which flow in the battery cells 73, in the unbalanced condition where the consumption currents (Ip) of the power supply circuits 75 of the first and second battery units 70A and 70B are 10 mA and 10.05 mA, respectively. A current flows in the voltage detection line 76. The amount of this current corresponds to the current difference between currents flowing in the adjacent battery cells 73. The reason is that the current difference between currents flowing in the adjacent battery cells 73 is provided by the current flowing in the voltage detection line 76. Accordingly, if currents of the same current value flow in the adjacent battery cells 73, a current does not flow in the voltage detection line 76.

The amount of a current gets larger which flows in one of the battery cells 73 as the one of the battery cells 73 is closer to an earth line 76A. The reason is that is input currents (Id) flow as shown by the arrows in FIG. 2. Since consumption currents (Ip) in FIG. 3(1) of the power supply circuits 75 are the same, all of current values of adjacent battery cells 73 are different from each other. Accordingly, disconnection of all of the voltage detection lines 76 can be detected.

However, as shown in FIG. 3 (2), in the case where the power consumption values of the power supply circuits 75 are different from each other, the current values of the battery cells 73a and 73b on the connection side between the battery blocks 72 of the first and second battery units 70A and 70B may be the same value of 10.06 mA. In this case, a current does not flow in the voltage detection line 76 connected to nodes 86 between these battery cells 73a and 73b. For this reason, disconnection of the voltage detection line cannot be detected.

The present invention has been developed for solving the aforementioned disadvantages. It is an important object of the present invention is to provide a power supply device capable of surely detecting disconnection of all of voltage detection lines and the voltages of battery cells.

SUMMARY OF THE INVENTION

A power supply device according to the present invention includes a plurality of battery units 10. Each of the battery units 10 includes a battery block 2, a voltage detecting circuit 4, a power supply circuit 5, and a disconnection detecting circuit 8. The battery block 2 includes a plurality of battery cells 3 that are serially connected to each other. The voltage detecting circuit 4 detects the voltages of the battery cells 3 through voltage detection lines 6. The battery block 2 is constructed of the battery cells 3. The power supply circuit 5 supplies electric power from the battery block 2 to the voltage detecting circuit 4. The voltage detecting circuit 4 is powered for operation by electric power from the battery block 2. The disconnection detecting circuit 8 detects disconnection of the voltage detection lines 6 based on the detection voltages of the battery cells 3, which are detected by the voltage detecting circuit 4. The battery blocks 2 of the battery units 10 are serially connected to each other. Thus, the battery blocks 2 constitute a battery pack 1. In the power supply device, at least one of the battery blocks 2 of the battery units 10 includes an unbalance resistor 12. The unbalance resistor 12 is connected to the at least one of the battery blocks 2 so that the power consumption of the at least one of the battery blocks 2 is increased. Thus, a current flows in the voltage detection line 6 that is connected to a node 16 between the at least one of the battery blocks 2 and an adjacent block of the battery blocks 2. The adjacent block of the battery blocks 2 is connected next to the at least one of the battery blocks 2. The at least one of the battery blocks 2 includes the unbalance resistor 12 connected to the at least one of the battery blocks 2.

According to the thus-constructed power supply device, since an unbalance resistor is connected in at least one of the battery blocks so that a current flows in one of the voltage detection lines, which is connected to a node between the at least one of the battery blocks, which includes the connected unbalance resistor, and an adjacent block of the battery blocks, which is connected next to the at least one of the battery blocks, currents can flow in all of the voltage detection lines in the normal condition. Therefore, the power supply device can certainly detect disconnection of all of the voltage detection lines and the voltages of battery cells. The reason is that the unbalance resistor controls the consumption current of the at least one of the battery blocks so that currents flow in all of the voltage detection lines.

The power supply device according to the present invention can further include an equalizing circuit 7 that achieves the cell balance between the battery cells 3, which constitute the battery blocks 2, and corrects the unbalance between the battery blocks 2, which constitute the battery pack 1. According to the thus-constructed power supply device, since the device includes equalizing circuit, it is possible to prevent that with elapsed time the voltages of the battery cells get unbalanced which constitute a battery block, and that with elapsed time the voltages and remaining capacities of the battery blocks get unbalanced which constitute a battery pack block.

In the power supply device according to the present invention, the equalizing circuit 7 can adjust the at least one of the battery blocks 2, which has higher power consumption, to a higher remaining capacity than the remaining capacity of other of the battery blocks 2, which has lower power consumption. According to the thus-constructed power supply device, since a battery block with higher consumption current is adjusted to a higher remaining capacity, it is possible to reduce the number of adjustment times for equalization.

In the power supply device according to the present invention, the disconnection detecting circuit 8 can determine that the voltage detection line 6 is disconnected if the voltage of corresponding one of the battery cells 3 detected by the voltage detecting circuit 4 is smaller than a predetermined voltage value, or if the voltage difference between the detected voltage value of corresponding one of the battery cells 3 and a predetermined voltage value is larger than a predetermined value. In the thus-constructed power supply device, it can be determined whether the detection voltage detected by the voltage detecting circuit decreases to about 0 V, or whether the voltage difference is deviated from the normal value to a large extent. Therefore, it is possible to certainly detect disconnection of voltage detection lines.

In the power supply device of the present invention, the power supply circuit 5 can be a DC-DC converter. In the thus-constructed power supply device, even if ICs or the like as DC-DC converters have unbalance of consumption currents, the consumption currents can be controlled by the unbalance resistor so that currents flow in all of the voltage detection lines. Therefore, it is possible to certainly detect disconnection of all of the voltage detection lines.

In the power supply device of the present invention, the battery pack 1 can be a driving battery that supplies electric power to an electric motor for driving a vehicle. According to the thus-constructed power supply device, even in the case where the battery pack has a large output capacity, which allows a vehicle to travel, the voltages of battery cells can be certainly detected. Therefore, it is possible to charge/discharge a number of battery cells with the battery cells being protected.

In the power supply device according to the present invention, the battery pack 1 can be connected to a solar battery, and can store electric power generated by the solar battery.

The above and further objects of the present invention as well as the features thereof will become more apparent from the following detailed description to be made in conjunction with the accompanying drawings.

BRIEF DESCRIPTION OF THE DRAWINGS

FIG. 3 is a diagram for explanation that the power supply device shown in FIG. 2 may not detect disconnection of one of voltage detection lines;

DETAILED DESCRIPTION OF THE INVENTION

The following description will describe embodiments according to the present invention with reference to the drawings.

Figure 4:
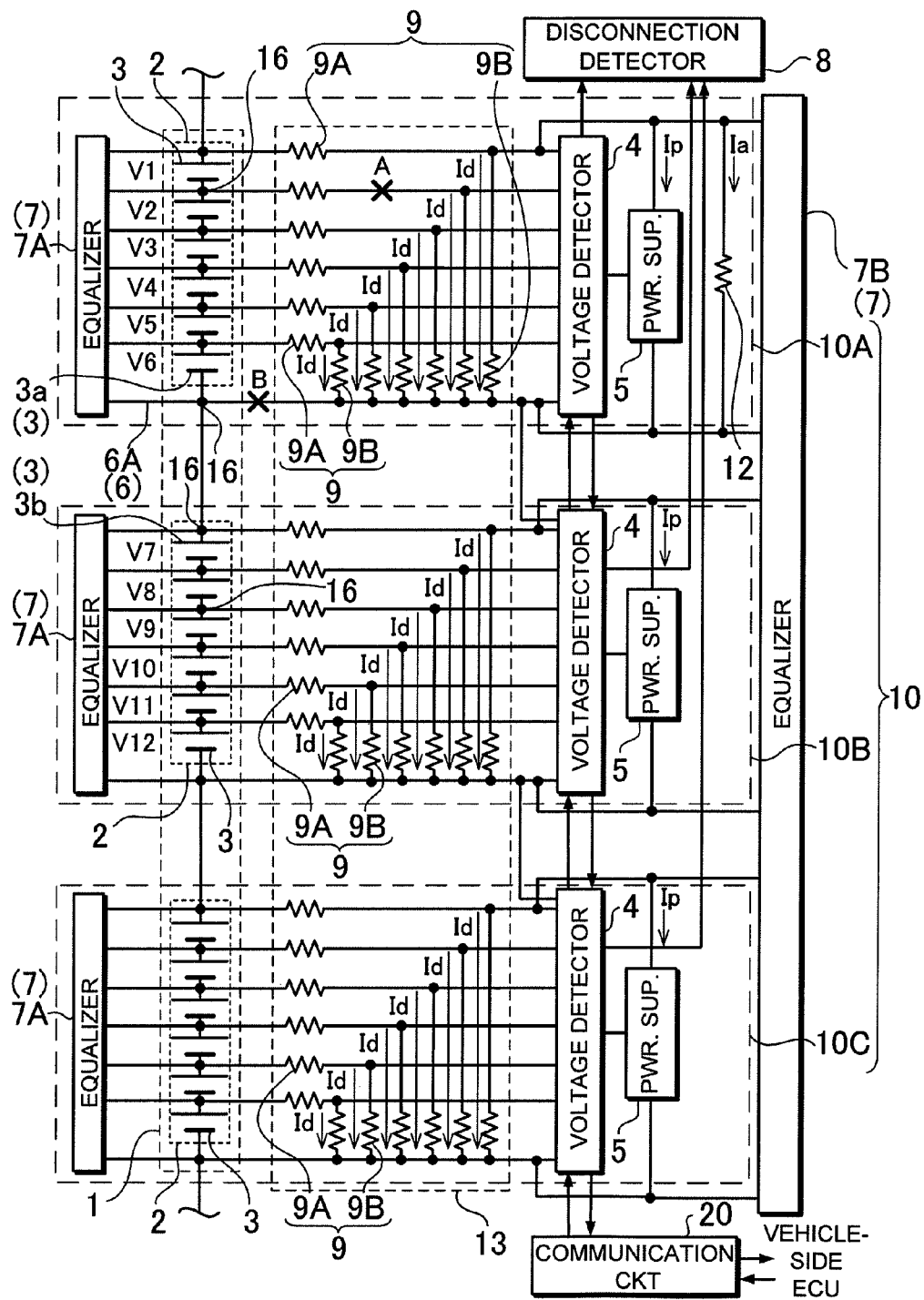
FIG. 4 is a block diagram of a power supply device according to an embodiment of the present invention.
Figure 4B:
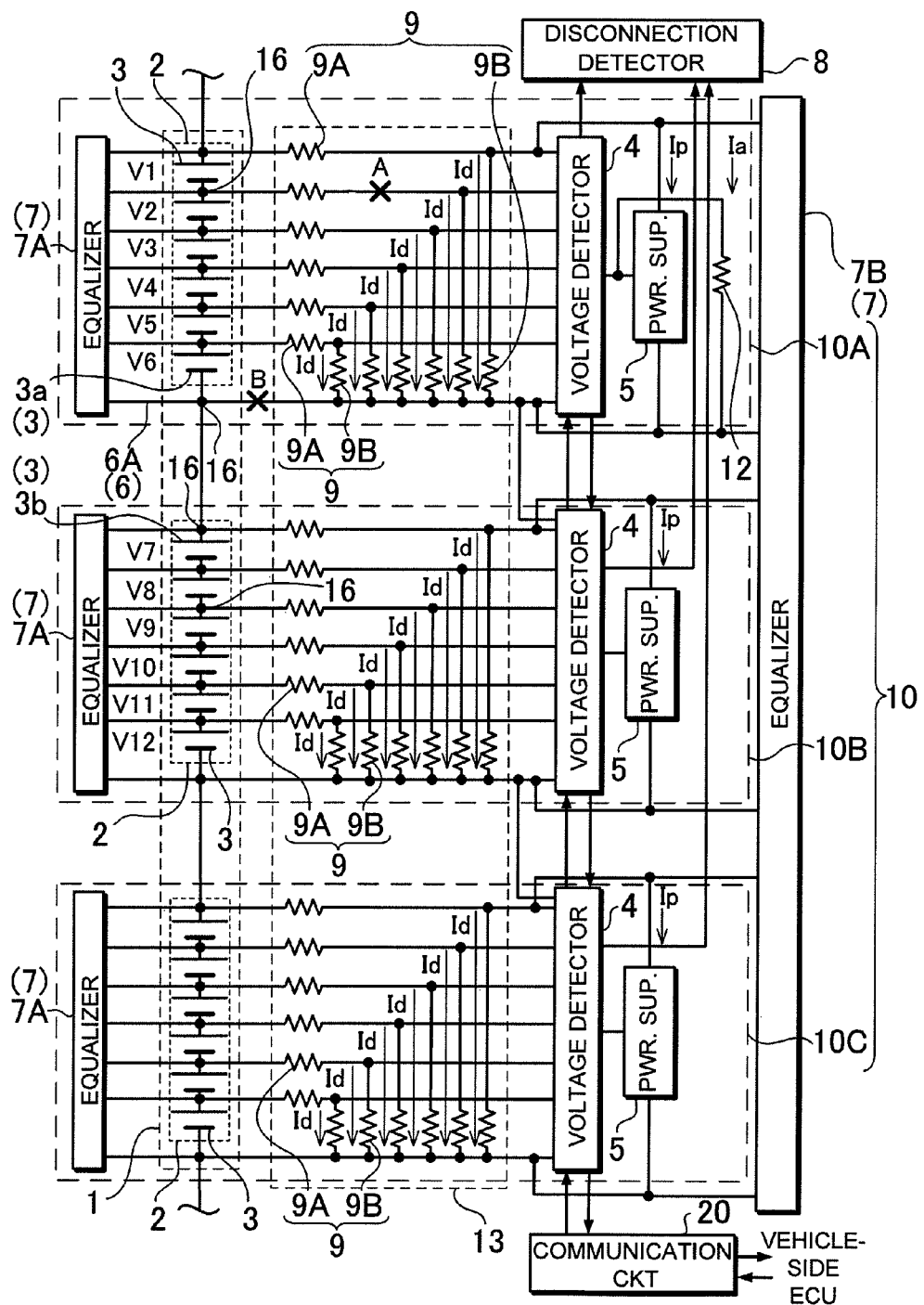
FIG. 4B is a block diagram of a power supply device according to another embodiment of the present invention.

A vehicle power supply device shown in FIG. 4 is installed in a hybrid car or electric vehicle, and is used to supply electric power to a motor for driving the vehicle. However, of the power supply device according to the present invention is not limited to be used as a power supply device for supplying electric power to an electric motor for driving a vehicle. The power supply device includes a number of battery cells, which are serially connected to each other for increasing output voltage, and can be used in any use where a large amount of output is required.

The power supply device includes a plurality of battery units 10. Each of the battery units 10 includes a battery block 2, a voltage detecting circuit 4, a power supply circuit 5, and a disconnection detecting circuit 8. The battery block 2 includes a plurality of battery cells 3 that are serially connected to each other. The voltage detecting circuit 4 detects the voltages of the battery cells 3 through voltage detection lines 6. The battery block 2 is constructed of the battery cells 3. The power supply circuit 5 supplies electric power from the battery block 2 to the voltage detecting circuit 4. The voltage detecting circuit 4 is powered for operation by electric power from the battery block 2. The disconnection detecting circuit 8 detects disconnection of the voltage detection lines 6 based on the detection voltages of the battery cells 3, which are detected by the voltage detecting circuit 4. The illustrated power supply device includes first, second and third battery units 10A, 10B and 10C as the battery units 10, which are serially connected to each other.

In a power supply device shown in FIG. 4 includes a battery pack 1 composed of three battery blocks 2, which are serially connected to each other. Each of the battery blocks 2 is composed of six battery cells 3, which are serially connected to each other. The battery cell 3 is composed of one lithium ion battery cell. However, it is noted that the battery cell may be composed of a plurality of storage cells serially connected to each other. In the case where the battery cell is composed of a plurality of battery cells serially connected to each other, the battery cell can be composed of battery cells such as nickel metal hydride battery cells and nickel-cadmium battery cells that are serially connected to each other.

Although the battery pack 1 shown in FIG. 4 has three battery blocks 2, which are serially connected to each other, the number of serially-connected battery blocks can be changed to adjust the output voltage of the battery pack. In the case where a power supply device with high output voltage is required, the number of serially-connected battery blocks is increased. Alternatively, the number of battery cells may be increased which constitute a battery block to increase the voltage of the battery block. Thus, the output voltage of a battery pack is adjusted to an optimum value by adjusting the number of serially-connected battery blocks, and the number of the battery cells, which constitute the battery block.

Each of the battery units 10 includes the voltage detecting circuit 4 for detecting the voltages of the battery cells 3, which constitute corresponding one of the battery blocks 2. In the case where the battery unit 10 is composed of the battery cells 3 each of which is composed of a lithium ion battery cell, the voltage detecting circuit 4 detects the voltages of all of the battery cells 3, which are serially connected to each other. Since the voltage detecting circuit 4 detects the voltages of all of the battery cells 3 so that the battery pack 1 can be charged/discharged under control based on the detected voltages of all of the battery cells 3, it is possible to prevent that every battery cell 3 is over-charged/over-discharged. Therefore, it is possible to improve the safety of the power supply device. In the case where the battery cell is composed of a plurality of nickel metal hydride battery cells, the battery cell can be composed of four to six nickel metal hydride battery cells, which are serially connected to each other, for example. In this case, the voltage detecting circuit can detect the voltages of the battery cells each of which is composed of the serially-connected four to six nickel metal hydride battery cells. Since this voltage detecting circuit detects the voltages of the battery cells each of which is composed of a plurality of serially-connected nickel metal hydride battery cells so that the battery pack can be charged/discharged under control based on the detected voltages of all of the battery cells, the voltage detecting circuit can be simplified even in the case where the battery pack includes a number of nickel metal hydride battery cells.

The voltage detecting circuit 4 detects the voltages of the battery cells 3, and transmits the detected voltages to vehicle side ECU (not shown) through a communication circuit 20. The vehicle side ECU calculates values in accordance with voltage signals provided from the power supply device and signals from accelerator and brake pedals, and controls charging/discharging operation of the battery pack 1 based on the calculated values.

The voltage detecting circuit 4 is connected to the positive and negative sides of the battery cells 3 through voltage detection lines 6. Wire harnesses are used as the voltage detection lines 6 for detecting the voltages of a number of battery cells 3, and connect the battery cells 3 and the input side of the voltage detecting circuit 4. The harness can be a flexible circuit board or the liker as well as electric wire. In addition, the harness can include connectors for ease of connection. If poor contact or disconnection occurs in the harness or connectors, the battery cell 3 is disconnected from to the input side of the voltage detecting circuit 4. Accordingly, the voltage of the battery cell 3 cannot be accurately detected.

The disconnection detection circuit 8 determines based on the detected voltages of the battery cell 3 whether the voltage detection line 6 is disconnected. For example, if one of the voltage detection lines 6 is disconnected at the point A shown in FIG. 4, the detection voltage of one of the battery cells 3 becomes 0 V which is detected through the one of the voltage detection lines 6 on which the point A is disconnected. The reason is that the voltage detection lines 6, which are connected on the voltage detecting circuit 4 side, are connected to the negative side of the battery block 2 through the input resistors 9. On the other hand, if one of the voltage detection lines is disconnected at the point B shown in FIG. 4, the detection voltages of the battery cells 3 in the first battery unit 10A will be deviated from the normal value. The reason is that the potential of the earth line will be deviated which is the negative side of the first battery unit 10A. For this reason, the disconnection detecting circuit 8 can determine that the voltage detection line 6 is disconnected if the voltage of corresponding one of the battery cells 3 detected by the voltage detecting circuit 4 is smaller than a predetermined voltage value, or if the voltage difference between the detected voltage value of the battery cell 3 and a predetermined voltage value is larger than a predetermined value.

In the case where when the first and second battery units 10A and 10B are serially connected to each other, a current flows in the voltage detection line 6 on which the point B is located if this voltage detection line is not disconnected, the detection voltages of the battery cells 3 will be deviated if the point B is disconnected. The reason is that although, in the case where the voltage detection line 6 including the point B is properly connected, the voltages of the battery cells 3 are detected relative to the negative side of the battery block 2 through a ground line 6A, if the point B is disconnected, the negative side of the battery block 2 is not connected to the input side of the voltage detecting circuit 4 so that the potential of the ground line 6A will be deviated to a potential different from the ground potential by the input resistors 9.

Contrary to this, in the case where a current does not flow in the voltage detection lines 6 on which the point B is located if this voltage detection line is not disconnected, virtually, this voltage detection line 6 is connected through a resistor with infinite resistance. Accordingly, in both the cases where this voltage detection line 6 is disconnected, or where a current does not flow even if this voltage detection line 6 is not disconnected, the potential of the ground line 6A is not changed.

For this reason, in the case where a current does not flow in one of the voltage detection lines 6 on which the point B is located, that is, in the voltage detection line 6 that is connected to a node 16 between the battery blocks 2 serially connected to each other, even if the one of voltage detection lines 6 is not disconnected, when this voltage detection line 6 is disconnected, the voltages of the battery cells 3 are not deviated. As a result, it is impossible to detect disconnection of this voltage detection line 6.

In the power supply device of FIG. 4, if the power supply circuits 5, which supply operating power to the voltage detecting circuits 4, have particular consumption currents (Ip), a current may not flow in the voltage detection line 6. The voltage detecting circuit 4 is supplied with electric power for operation of the voltage detecting circuit from corresponding one of the battery blocks 2. To achieve this, the voltage detecting circuit 4 is supplied with electric power as operating power from corresponding one of the battery blocks 2 by corresponding one of the power supply circuits 5. The power supply circuit 5 is connected to the positive and negative sides of corresponding one of the battery blocks 2. In the power supply device, which includes the battery pack 1 composed of three battery blocks 2, the power supply device includes three voltage detecting circuits 4. The voltage detecting circuit 4 is supplied with electric power from corresponding one of the battery blocks 2. In the battery block 2, which includes the battery cells 3 composed of six lithium ion battery cells serially connected to each other, the output voltage of the battery block 2 is about 22 V. This voltage is supplied to the voltage detecting circuit 4 through the power supply circuit 5 as power source of the voltage detecting circuit 4. The power supply circuit 5 is a DC-DC converter, which converts the output voltage of about 22 V from the battery block 2 into an optimum voltage for power source of the voltage detecting circuit 4 (e.g., 5 or 12 V), and stably provides the optimum voltage.

The consumption currents of the DC/DC converters are not the same value which serve as the power supply circuits 5 for supplying operating electric power to the voltage detecting circuits 4 from corresponding one of the battery blocks 2. The power supply circuits 5 are composed of analog ICs. It is impossible to manufacture semiconductor elements, which constitutes a DC-DC converter, with the same consumption current. For this reason, the consumption currents of the power supply circuits 5 are unbalanced. The unbalance between the consumption currents of the power supply circuits 5 may prevent a current from flowing in the voltage detection line 6.

The same amount of the consumption current (Ip) of the power supply circuit 5 flows in the battery cells 3, which are serially connected to each other. The reason is that electric power is supplied to the power supply circuit 5 from the battery cells 3, which are serially connected to each other.

In addition, an input current (Id) flows into corresponding one of the battery cells 3 through corresponding one of the input resistors 9, which is connected the input side of the voltage detecting circuit 4. The input resistor 9 is a resistor, which is connected to the input side of the voltage detecting circuit 4 so that the voltage of corresponding one of the battery cells 3 is stably detected. In the voltage detecting circuit 4 shown in FIG. 4, the input resistor 9 is a series resistor, which constitutes a voltage dividing resistor circuit 13. The input resistor 9 reduces the voltage at the node 16 of corresponding one of the battery cells 3 into the voltage range, which can be detected by in the voltage detecting circuit 4, and provides the reduced voltage to the voltage detecting circuit 4.

The illustrated input resistor 9 is composed of first and second resistors 9A and 9B, which are serially connected to each other. In the input resistor 9, the node between the first and second resistors 9A and 9B is connected to the input side of the voltage detecting circuit 4. The other end of the first resistor 9A is connected to the node 16 of corresponding one of the battery cells 3, while the other end of the second resistor 9B is connected to one of the voltage detection lines 6, which is the ground line 6A. The input resistor 9 provides a fraction of the voltage at the node 16 of corresponding one of the battery cells 3 to the voltage detecting circuit 4. The fraction obtained by the voltage dividing circuit 13 is specified by the resistance ratio between the first and second resistors 9A and 9B, which are serially connected to each other. The fractions obtained by the voltage dividing resistor circuit 13 are specified to provide substantially the same input voltage from all of the nodes 16 to the voltage detecting circuit 4. This voltage dividing resistor circuit 13 is preferably arranged in proximity to the input side of the voltage detecting circuit 4. In this case, the voltage detection lines 6 extend from the voltage dividing resistor circuit 13, and are connected to the nodes 16 of the battery cells 3.

Alternatively, in the voltage dividing circuit, the second resistor may be arranged in proximity to the input side of the voltage detecting circuit, while the first resistor may be arranged in proximity to the node of corresponding one of the battery cells.

Input currents (Id) flow from the battery cells 3 through the input resistors 9 toward the negative battery block 2 side as shown by the arrows. The amounts of the input currents (Id), which flow in the battery cells 3, get larger as corresponding one of the battery cells 3 is connected closer to the negative side. The reason is that the input currents (Id) of some of the battery cells 3 connected on the positive side flow into other of the battery cells 3 connected on the negative side.

In addition to the input current (Id), the consumption current of the power supply circuit 5 also flows into all of the battery cells 3. Since the consumption current of the power supply circuit 5 flows in all of the battery cells 3, the amount of current in each battery cell 3 is the value obtained by adding the input currents (Id) to the consumption current (Ip). The same amount of the consumption current (Ip) of the power supply circuit 5 flows in the battery cells 3, which are serially connected to each other. However, the amounts of consumption currents (Ip) of the power supply circuits 5 cannot be the same. A current may be prevented from flowing in the voltage detection line 6 by the variation between consumption currents (Ip) of the power supply circuits 5.

As discussed above, in the case of FIG. 3(2) where the first and second battery units 70A and 70B are serially connected to each other which include the power supply circuits 75 with consumption currents (Ip) of 10 and 10.5 mA, respectively, the amount of the current in the battery cell 73a on the negative side in the first battery unit 70A is same as the battery cell 73b on the positive side in the second battery unit 70B. If the currents of the adjacent battery cells 73a and 73b are the same value, a current does not flow in the voltage detection line 76 connected to the node 86 between these battery cells 73a and 73b. The reason is that, in the voltage detection line 76, an amount of current will flow corresponding to the current difference between the battery cells 73. In the case where a current does not flow in the voltage detection line 76, since this voltage detection line 76 is virtually connected to a resistor with infinite resistance, there is no difference between the voltages detected on this voltage detection line 76 in disconnection and connection states of this voltage detection line 76. For this reason, if a current does not flow in the voltage detection line 76, disconnection cannot be detected based on detection of the voltage of corresponding one of the battery cells 73.

Figure 5:
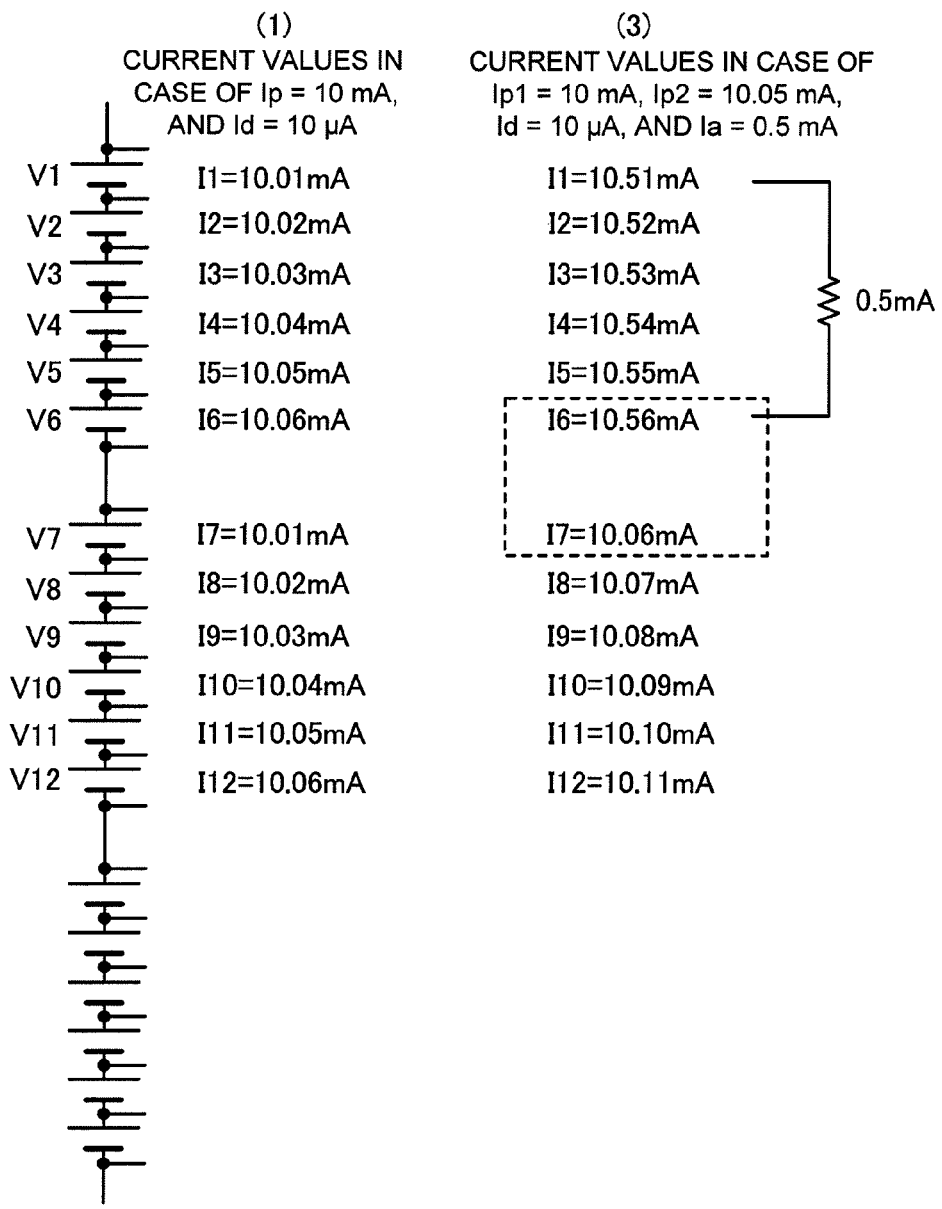
FIG. 5 is a diagram for explanation that currents can flow in all of voltage detection lines in the power supply device shown in FIG. 4.

In the power supply device of FIG. 4, in order to certainly detect disconnection of the voltage detection lines 6, an unbalance resistor 12 is connected to the battery block 2 of the first battery unit 10A. The unbalance resistor 12 increases power consumption of the battery block 2 so that currents flow in all of the voltage detection lines 6. In the illustrated power supply device, the unbalance resistor 12 is connected to the both ends of the battery block 2 in parallel. The unbalance resistor 12 shown in FIGS. 4 and 5 is an electric resistor in which 0.5 mA of consumption current (Ia) flows. While this example employs the unbalance register connected to the both ends of the battery block, modified configuration is applicable, i.e., one end of the unbalance register is connected between a voltage detection circuit and power source, and the other end is connected to the lowest minus side of battery block. In this case, unnecessary discharge of the battery block is reduced, since electric power consuming current flows the unbalance register only when the power source is active.

FIG. 5(3) shows current values of currents, which flow into the battery cells 3, in the case where the consumption currents (Ip) of the power supply circuit 5 of the first and second battery unit 10A and 10B are 10 mA and 10.05 mA, respectively, and the consumption current (Ia) of the unbalance resistor 12 is 0.5 mA. In addition to the input current (Id), the consumption current (Ip) of the power supply circuit 5 and the consumption current (Ia) of the unbalance resistor 12 flow into all of the battery cells 3. If the current values of the battery cells 3 are the same which are serially connected adjacent to each other, a current does not flow in the voltage detection line 6. Contrary to this, current values of currents are different which flow in the battery cell 3a of on the negative side of the first battery unit 10A (10.56 mA) and in the battery cell 3b on the positive side of the second battery unit 10B (10.06 mA) as shown in FIG. 5. Accordingly, a current constantly flows in the voltage detection line 6. Therefore, it is possible to disconnection of the voltage detection lines 6.

Figure 1:
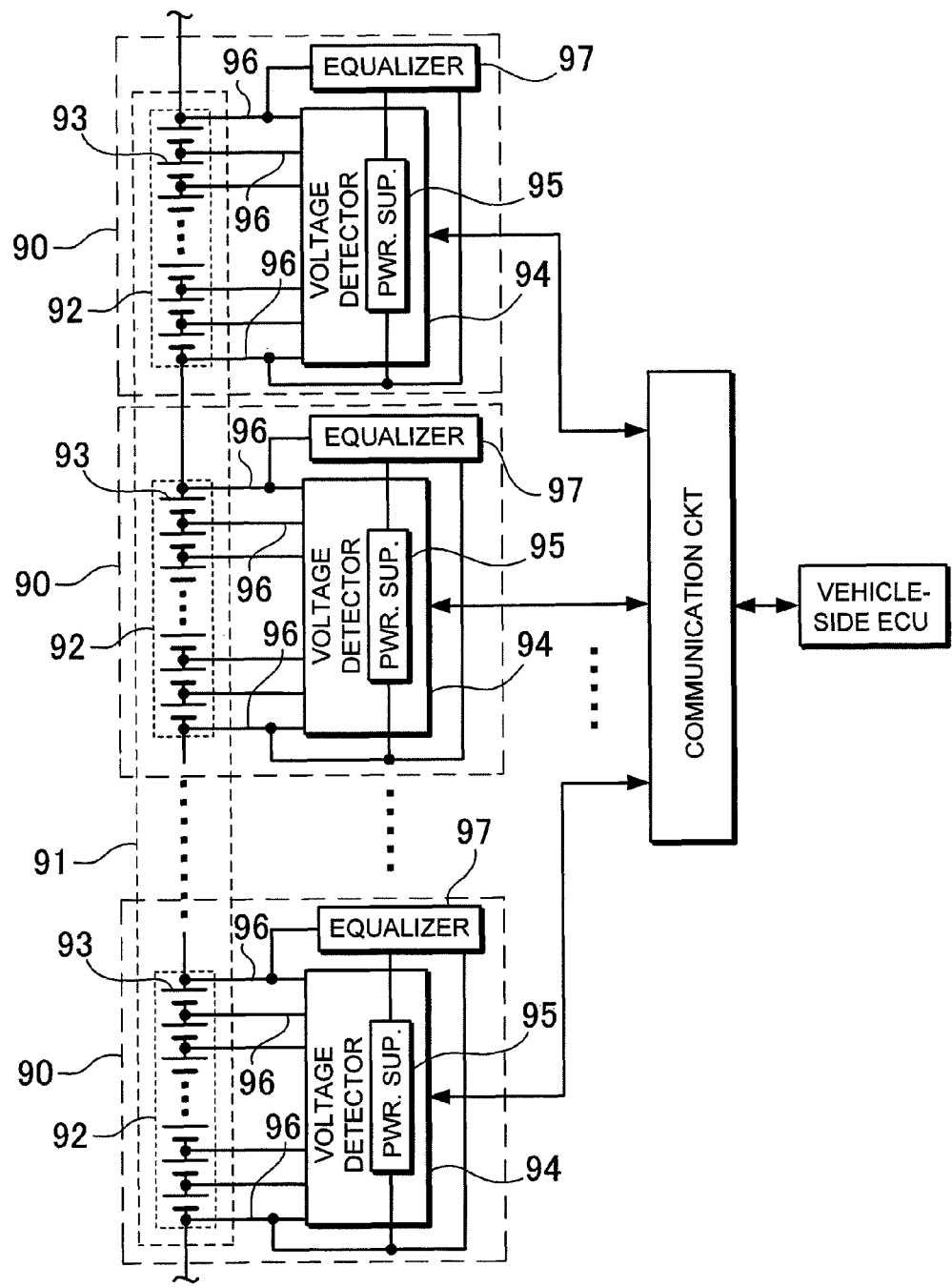
FIG. 1 is a block diagram showing a known power supply device.
Figure 2:
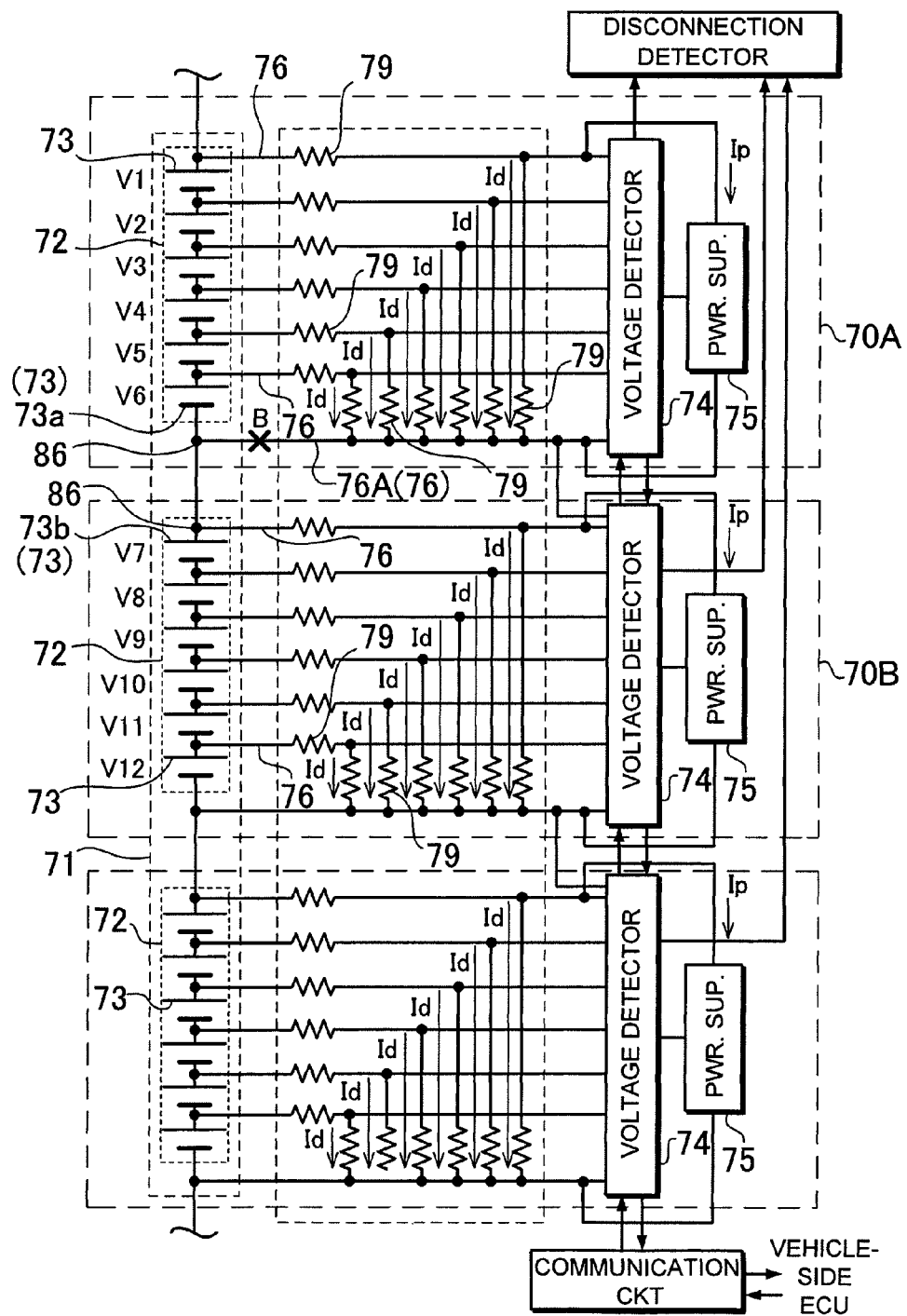
FIG. 2 is a block diagram showing a known power supply device with currents being detected in voltage detection lines.

As shown in FIGS. 2 and 3, a current does not flow in the voltage detection line 86 including the point B connected between the first battery unit 70A and the second battery unit 70B, if the current difference between the consumption currents (Ip) of the power supply circuits 75 of the first and second battery units 70A and 70B (0.05 mA in FIG. 3) is equal to the difference between the currents, which flow in the battery cell 73a connected closest to the negative side of the first battery unit 70A (10.06 mA in FIG. 3) and the battery cell 73b connected closest to the positive side of the second battery unit 70B (10.01 mA in FIG. 3). To prevent this, the unbalance resistor 12 allows a larger amount of current than the current difference (0.05 mA in FIG. 3) to flow so that this current bypasses the power supply circuit 5. As a result, a current can flow in the voltage detection line 6 including the point B.

In the power supply circuits 5 composed of DC-DC converters, since there is variation between DC-DC converters, their consumption currents (Ip) cannot be the same. The variation between consumption currents (Ip) may prevent a current from flowing in the voltage detection line 6. For this reason, when flowing through the unbalance resistor 12 between the positive and negative sides of the power supply circuit 5, the bypass current is set to a value larger than the variation between the consumption currents (Ip) caused by the variation between the power supply circuits 5. For example, in the case of a device where the variation between the currents of the DC-DC converters as the power supply circuits 5 is 0.1 mA, when the bypass current of the unbalance resistor 12 is set to 0.5 mA or more, it is possible to prevent that a current does not flow in the voltage detection line 6.

In FIGS. 4 and 5, the unbalance resistor 12 is connected to the first battery unit 10A so that a current flows in the voltage detection line 6 connected between the first and second battery units 10A and 10B. Although the unbalance resistor 12 is connected to the first battery unit 10A in the power supply device shown in FIG. 4 so that currents flow in all of the voltage detection lines 6, which are not disconnected, the unbalance resistor can be connected to the second battery unit. In the case where the power supply device includes the serially-connected battery blocks having a plurality of battery units, when the unbalance resistor is connected to one or more of the power supply circuits of the battery units, a current can flow in all of the voltage detection lines, which are not disconnected. In this power supply device, the unbalance resistor can be connected in the one or more of battery unit so that the variation between the consumption currents (Ip) caused by the variation between the power supply circuits is smaller than the difference between the currents, which flow in the battery cells connected to the boundary between the adjacent battery units.

Generally, in the case where a power supply device includes three or more battery units serially connected to each other, the unbalance resistor is connected to one of two battery units, which are connected adjacent to each other and have variation between the consumption currents (Ip) caused by the variation between power supply circuits. As a result, currents can flow in all of the voltage detection lines, which are not disconnected. For example, in the power supply device includes three serially-connected battery units, in the case where there is variation between consumption currents (Ip) of the power supply circuits of the first and second battery units, and there is variation between consumption currents (Ip) of the power supply circuits of the second and third battery units, the unbalance resistors are connected to the first and third battery units, or the unbalance resistor is connected only to the second battery unit so that currents can flow in all of the voltage detection lines, which are not disconnected. Alternatively, the unbalance resistors with bypass currents different from each other may be connected to the battery units, which are connected adjacent to each other so that currents flow in all of the voltage detection lines, which are not disconnected.

In the thus-constructed power supply device, uneven amounts of currents flow in the battery cells 3 so that currents flow in all of the voltage detection lines 6. Accordingly, the voltages of the battery cells 3 will be unbalanced as time elapses. Each of the battery units 10 includes an equalizing circuit 7A, which eliminates the unbalance between the voltages of the battery cells 3. The equalization circuit 7A discharges battery cells 3 with higher voltage so that the voltages of the battery cells 3 are equalized.

In the power supply device including a plurality of battery units 10, the voltages and the remaining capacities will be also unbalanced between the battery blocks 2, which constitute the battery units 10, as time elapses. The power supply device includes an equalizing circuit 7B, which eliminates the unbalance between the battery units 10. This equalizing circuit 7B discharges one or more of the battery blocks 2 with higher voltage or remaining capacity for equalization.

In the battery unit 10 to which the unbalance resistor 12 is connected, the consumption current of the battery block 2 is increased by the bypass current flowing through the unbalance resistor 12. When the equalizing circuits 7 equalize the voltages or remaining capacities in the battery block 2 with larger consumption current and the battery block 2 with smaller consumption current, the voltage or the remaining capacity of the battery block 2 with larger consumption current will be smaller than the battery block 2 with smaller consumption current. For this reason, it is necessary to frequently equalize the voltages or remaining capacities of the battery units 10. This problem can be solved by the equalizing circuit 7, which adjusts the battery block 2 with higher power consumption to a higher voltage or remaining capacity than the voltage or remaining capacity of the battery block 2 with lower power consumption. The reason is that, since, in the equalization, the voltage or remaining capacity of the battery block 2 with larger consumption current is adjusted to a predetermined value larger than the battery block 2 with lower power consumption, even if the battery block 2 with larger consumption current is discharged at a larger amount of current than the battery block 2 with smaller consumption current, it will take time to bring the voltage or remaining capacity difference between the battery block 2 with larger consumption current and the battery block 2 with smaller consumption current into a predetermined range.

(Power Storage Type Power Supply Device)

Figure 6:
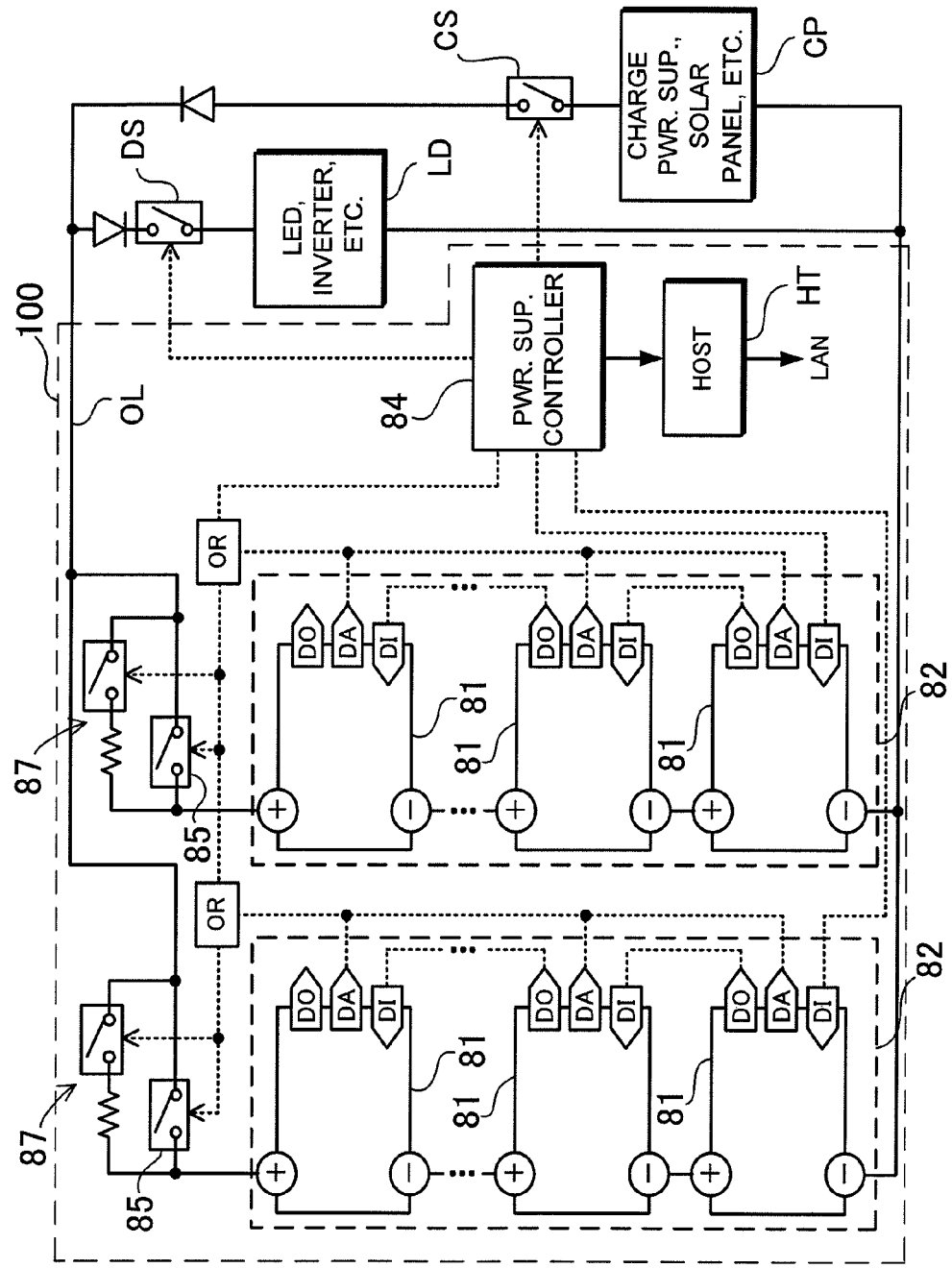
FIG. 6 is a block diagram a power storage type power supply device to which the present invention is applied.

The aforementioned power supply device can be used as a power supply for vehicles. The power supply device can be installed on electric vehicles such as hybrid cars that are driven by both an engine and a motor, and electric vehicles that are driven only by a motor. The power supply device can be used as a power supply device for these types of vehicles. The power supply device can be used not only as power supply of mobile unit such as vehicle but also as stationary power storage. For example, examples of stationary power storage devices can be provided by an electric power system for home use or plant use that is charged with solar electric power or with midnight electric power and is discharged when necessary, a power supply for street lights that is charged with solar electric power during the daytime and is discharged during the nighttime, or a backup power supply for signal lights that drives signal lights in the event of a power failure. FIG. 6 shows a circuit diagram according to this embodiment. This illustrated power supply device 100 includes battery units 82 each of which includes a plurality of battery packs 81 that are connected to each other. In each of battery packs 81, a plurality of battery cells are connected to each other in serial and/or in parallel. The battery packs 81 are controlled by a power supply controller 84. In this power supply device 100, after the battery units 82 are charged by a charging power supply CP, the power supply device 100 drives a load LD. The power supply device 100 has a charging mode and a discharging mode. The Load LD and the charging power supply CP are connected to the power supply device 100 through a discharging switch DS and a charging switch CS, respectively. The discharging switch DS and the charging operation switch CS are turned ON/OFF by the power supply controller 84 of the power supply device 100. In the charging mode, the power supply controller 84 turns charging operation switch CS ON, and turns the discharging switch DS OFF so that the power supply device 100 can be charged by the charging power supply CP. When the charging operation is completed so that the battery units are fully charged or when the battery units are charged to a capacity not lower than a predetermined value, if the load LD requests electric power, the power supply controller 84 turns the charging operation switch CS OFF, and turns the discharging switch DS ON. Thus, operation is switched from the charging mode to the discharging mode so that the power supply device 100 can be discharged to supply power to the load LD. In addition, if necessary, the charging operation switch CS may be turned ON, while the discharging switch DS may be turned ON so that the load LD can be supplied with electric power while the power supply device 100 can be charged. In addition to solar battery, wind power generation, a fuel cell, and the like, the midnight electric power of commercial power can be used as the charging power supply CP.

The load LD driven by the power supply device 100 is connected to the power supply device 100 through the discharging switch DS. In the discharging mode of the power supply device 100, the power supply controller 84 turns the discharging switch DS ON so that the power supply device 100 is connected to the load LD. Thus, the load LD is driven with electric power from the power supply device 100. Switching elements such as FET can be used as the discharging switch DS. The discharging switch DS is turned ON/OFF by the power supply controller 84 of the power supply device 100. The power supply controller 84 includes a communication interface for communicating with an external device. In the power supply device according to the embodiment shown in FIG. 6, the power supply controller is connected to a host device HT based on existing communications protocols such as UART and RS-232C. Also, the power supply device may include a user interface that allows users to operate the electric power system if necessary. Each of the battery packs 81 includes signal terminals and power supply terminals. The signal terminals include a pack input/output terminal DI, a pack abnormality output terminal DA, and a pack connection terminal DO. The pack input/output terminal DI serves as a terminal for providing/receiving signals to/from other battery packs and the power supply controller 84. The pack connection terminal DO serves as a terminal for providing/receiving signals to/from other battery packs as slave packs. The pack abnormality output terminal DA serves as a terminal for providing an abnormality signal of the battery pack to the outside. Also, the power supply terminal is a terminal for connecting one of the battery packs 81 to another battery pack in series or in parallel. In addition, the battery units 82 are connected to an output line OL through parallel connection switched 85, and are connected in parallel to each other.

In addition, this power supply device 100 has an equalizing mode for equalizing of the states of the battery units 82. The battery units 82 are connected to an output line OL through parallel connection switched 85, and are connected in parallel to each other. For this reason, the power supply device includes equalizing circuits 87 that are controlled by the power supply controller 84. The equalization circuits 87 suppress variation of the battery remaining capacities between the battery units 82.

It should be apparent to those with an ordinary skill in the art that while various preferred embodiments of the invention have been shown and described, it is contemplated that the invention is not limited to the particular embodiments disclosed, which are deemed to be merely illustrative of the inventive concepts and should not be interpreted as limiting the scope of the invention, and which are suitable for all modifications and changes falling within the scope of the invention as defined in the appended claims. The present application is based on Application No. 2010-172,809 filed in Japan on Jul. 30, 2010, and No. 2011-95,534 filed in Japan on Apr. 21, 2011, the contents of which are incorporated herein by references.

What is claimed is:

1. A power supply device comprising a plurality of battery units, each of the battery units comprising:
   a battery block that includes a plurality of battery cells serially connected to each other;
   a voltage detecting circuit that detects the voltages of the battery cells, which constitute the battery block, through voltage detection lines;
   a power supply circuit that supplies electric power for operating the voltage detecting circuit from the battery block; and
   a disconnection detecting circuit that detects disconnection of the voltage detection lines based on the detection voltages of the battery cells, which are detected by the voltage detecting circuit,
   wherein the battery blocks of the battery units are serially connected to each other to constitute a battery pack,
   at least one of the battery blocks of the battery units includes an unbalance resistor that is connected to the battery block to increase the power consumption of the battery block so that a current flows in the voltage detection line that is connected to a node between the battery block and an adjacent block of the battery block, which is connected next to the battery block to which the unbalance resistor connected, and
   the unbalance resistor has a preset value of resistance that allows flow of a bypass current thereby bypassing the power supply circuit through the unbalance resistor, the bypass current being larger than a variation of consumption currents flowing through the power supply circuit, the variation being caused by individual differences of the power supply circuit.

2. The power supply device according to claim 1 further comprising an equalizing circuit that achieves the cell balance between the battery cells, which constitute the battery blocks, and corrects the unbalance between the battery blocks, which constitute the battery pack.

3. The power supply device according to claim 2, wherein the equalizing circuit adjusts at least one of the battery blocks, which has higher power consumption, to a higher voltage or remaining capacity than the voltage or remaining capacity of other of the battery blocks, which has lower power consumption.

4. The power supply device according to claim 1, wherein the disconnection detecting circuit determines that the voltage detection line is disconnected if the voltage of a corresponding one of the battery cells detected by the voltage detecting circuit is smaller than a predetermined voltage value, or if the voltage difference between the detected voltage value of the corresponding one of the battery cells and a predetermined voltage value is larger than a predetermined value.

5. The power supply device according to claim 1, wherein the power supply circuit is a DC/DC converter.

6. The power supply device according to claim 1, wherein the battery pack is a driving battery that supplies electric power to an electric motor for driving a vehicle.

7. The power supply device according to claim 1, wherein the battery pack is connected to a solar battery, and can store electric power generated by the solar battery.

* * * * *